US008106918B2

(12) United States Patent
Cai et al.

(10) Patent No.: US 8,106,918 B2
(45) Date of Patent: Jan. 31, 2012

(54) APPARATUS AND METHOD FOR TEXTURE LEVEL OF DETAIL COMPUTATION

(75) Inventors: Mike M. Cai, Newark, CA (US); Jean-Didier Allegrucci, Sunnyvale, CA (US); Anthony Ya-Nai Tai, San Jose, CA (US)

(73) Assignee: Vivante Corporation, Sunnyvale, CA (US)

( * ) Notice: Subject to any disclaimer, the term of this patent is extended or adjusted under 35 U.S.C. 154(b) by 955 days.

(21) Appl. No.: 11/799,710

(22) Filed: May 1, 2007

(65) Prior Publication Data

US 2008/0273042 A1   Nov. 6, 2008

(51) Int. Cl.
*G09G 5/00* (2006.01)

(52) U.S. Cl. ........ 345/586; 345/552; 345/582; 345/587; 345/602; 345/643

(58) Field of Classification Search .................. None
See application file for complete search history.

(56) References Cited

U.S. PATENT DOCUMENTS

| 6,078,335 A * | 6/2000 | Wong et al. | 345/582 |
| 6,618,049 B1 * | 9/2003 | Hansen | 345/423 |
| 6,975,320 B1 * | 12/2005 | Bentz | 345/428 |

* cited by examiner

*Primary Examiner* — Antonio Caschera
(74) *Attorney, Agent, or Firm* — David R. Stevens; Stevens Law Group

(57) ABSTRACT

A graphic processing system to compute a texture level of detail. An embodiment of the graphic processing system includes a memory device, a driver, and level of detail computation logic. The memory device is configured to implement a first lookup table. The first lookup table is configured to provide a first level of detail component. The driver is configured to calculate a log value of a second level of detail component. The level of detail computation logic is coupled to the memory device and the driver. The level of detail computation logic is configured to compute a level of detail for a texture mapping operation based on the first level of detail component from the lookup table and the second level of detail component from the driver. Embodiments of the graphic processing system facilitate a simple hardware implementation using operations other than multiplication, square, and square root operations.

15 Claims, 5 Drawing Sheets

US 8,106,918 B2

APPARATUS AND METHOD FOR TEXTURE LEVEL OF DETAIL COMPUTATION

BACKGROUND OF THE INVENTION

In video graphics applications, many techniques are used to render graphical images of different shapes and sizes. Typically, graphical images are made up of thousands, or even millions, of primitive shapes such as triangles. Each triangle is defined by the coordinates of its vertices. In order to enhance the three-dimensional aspects of a graphical rendering, texture may be added to each of the triangles or other drawing units. Texture coordinates are used to assign texture maps to each object as it is rendered on a display device. A texture map is an array of texture elements (texels) combined to form a standard block of texture.

Mapping textures to rendered objects can be complicated by the depths (i.e., distances relative to the viewer) of the various objects in a rendered scene. The orientation of the rendered objects can also affect the complexity of mapping the textures to the rendered objects. Furthermore, applying texture to a single object can be complicated if the object varies in depth and orientation on the display device.

Mipmapping is one conventional technique used to apply different texture maps, each having a corresponding level of detail (LOD), to such objects. Mipmapping prefilters a texture map and stores the different prefiltered versions, or levels, to decrease the complexity of texture minification calculations. Texture minification refers to minimizing a prefiltered texture map with a standard level of detail to correlate multiple texels to a single pixel because the rendered object is miniaturized on the display device to appear far away. In contrast, texture magnification refers to correlating the texture level of detail to an object that is magnified on the display device to appear relatively close to the viewer. However, it should be noted that texture filtering also may be used with texture magnification because the pixels may be misaligned relative to the texels of a particular texture map.

A texture level of detail computation is implemented to determine which texture map to use to apply texture to a particular rendered object. In general texture maps with greater detail (sometimes designated as "level 0") are used for close objects, and texture maps with less detail (sometimes designated as "level 1," "level 2," "level 3," and so on) are used for farther objects.

A conventional two-dimensional (2D) texture level of detail computation implements two multiply operations, two square operations, one add operation, and one square root operation for each of two log terms in order to calculate the expected value. Similarly, a conventional three-dimensional (3D) texture level detail computation implements three multiply operations, three square operations, two add operations, and one square root operation for each of three log terms. Since these computations are often performed in 32 bit floating point space, these conventional texture level of detail computations are expensive to implement in hardware.

SUMMARY OF THE INVENTION

Embodiments of a system are described. In one embodiment, the system is a graphic processing system to compute a texture level of detail. An embodiment of the graphic processing system includes a memory device, a driver, and level of detail computation logic. The memory device is configured to implement a first lookup table. The first lookup table is configured to provide a first level of detail component. The driver is configured to calculate a log value of a second level of detail component. The level of detail computation logic is coupled to the memory device and the driver. The level of detail computation logic is configured to compute a level of detail for a texture mapping operation based on the first level of detail component from the lookup table and the second level of detail component from the driver. Embodiments of the graphic processing system facilitate a simple hardware implementation using operations other than multiplication, square, and square root operations. Other embodiments of the system are also described.

Embodiments of a method are also described. In one embodiment, the method is a method for computing a texture level of detail. An embodiment of the method includes computing a first log term based on a first plurality of level of detail components. The first log term corresponds to a first dimension of a texture map. The first plurality of level of detail components are generated with lookup and arithmetic operations other than multiplication. The method also includes computing a second log term based on a second plurality of level of detail components. The second log term corresponds to a second dimension of a texture map. The second plurality of level of detail components are generated with lookup and arithmetic operations other than multiplication. The method also includes computing the level of detail according to a maximum of the first and second log terms. Other embodiments of the method are also described.

Embodiments of an apparatus are also described. In one embodiment, the apparatus is an apparatus for computing a texture level of detail. An embodiment of the apparatus includes means for computing first and second log terms using operations other than multiplication, square, and square root operations. The apparatus also includes means for computing the texture level of detail based on the first and second log terms. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
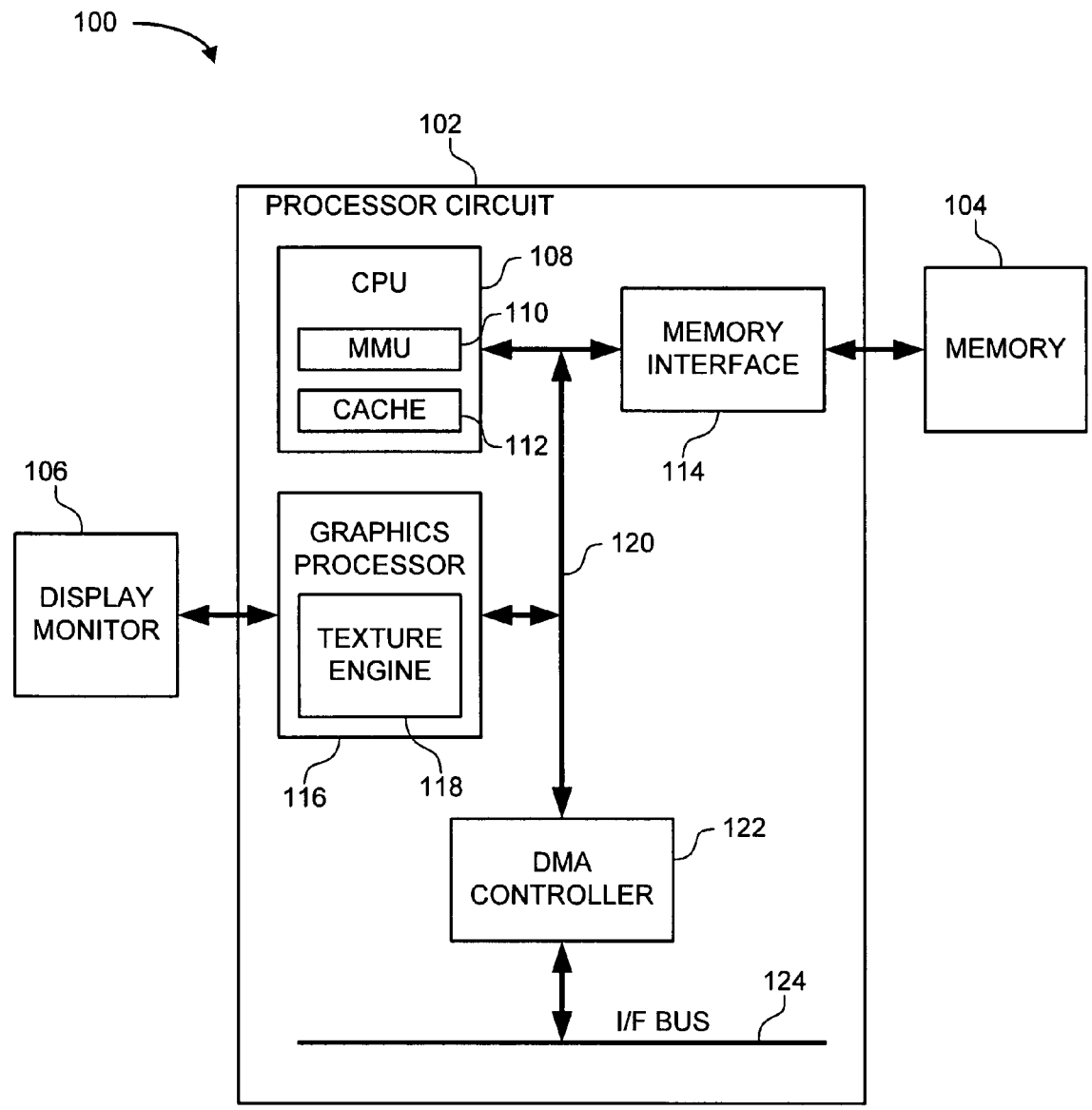
FIG. 1 depicts a schematic block diagram of one embodiment of a computer graphics system.

FIG. 1 depicts a schematic block diagram of one embodiment of a computer graphics system 100. The computer graphics system 100 may implement texture mapping and level of detail computations, as described below. As shown in FIG. 1, the computer graphics system 100 is a highly integrated system which includes an integrated processor circuit 102, a memory device 104, and a display monitor 106. In one embodiment, the memory device 104 includes read-only-memory (ROM) and random access memory (RAM). Other embodiments may include different types of memory devices. The highly integrated architecture allows power to be conserved. Other embodiments may include other components such as a peripheral controller (not shown).

The depicted integrated processor circuit 102 includes a processing unit (CPU) 108 which includes a memory management unit (MMU) 110 and one or more instruction and/or data caches 112. The integrated processor circuit 102 also includes a memory interface 114 to interface with the memory 104. The integrated processor circuit 102 also includes graphics processor 116 which includes a texture engine 118. In one embodiment, the texture engine 118 implements one or more texture operations related to the texture pipeline 130 shown in FIG. 3 and described in more detail below. In particular, the texture engine 118 may apply one or more texture maps to a graphical object. The texture engine 118 determines which texture map to apply based on a level of detail calculation. The graphics processor 116 is coupled to the processing unit 108 and the memory interface 114 by a bus 120.

A direct memory access (DMA) controller 122 is also coupled to the bus 120. The DMA controller 122 couples the bus 120 to an interface (I/F) bus 124 to which other core logic functional components (not shown) such as an encoder/decoder (CODEC) interface, a parallel interface, a serial interface, and an input device interface may be coupled. In one embodiment, the DMA controller 122 accesses data stored in the memory device 104 via the memory interface 114 and provides the data to peripheral devices connected to the I/F bus 124. The DMA controller 122 also sends data from the peripheral devices to the memory device 104 via the memory interface 114.

In one embodiment, the graphics processor 116 requests and accesses graphical data from the memory device 104 via the memory interface 114. The graphics processor 116 then processes the data, formats the processed data, and sends the formatted data to the display device 106. In some embodiments, the display device 106 may be a liquid crystal display (LCD), a cathode ray tube (CRT), or a television (TV) monitor. Other embodiments of the computer graphics system 100 may include more or less components and may be capable of implementing fewer or more operations.

Figure 2:
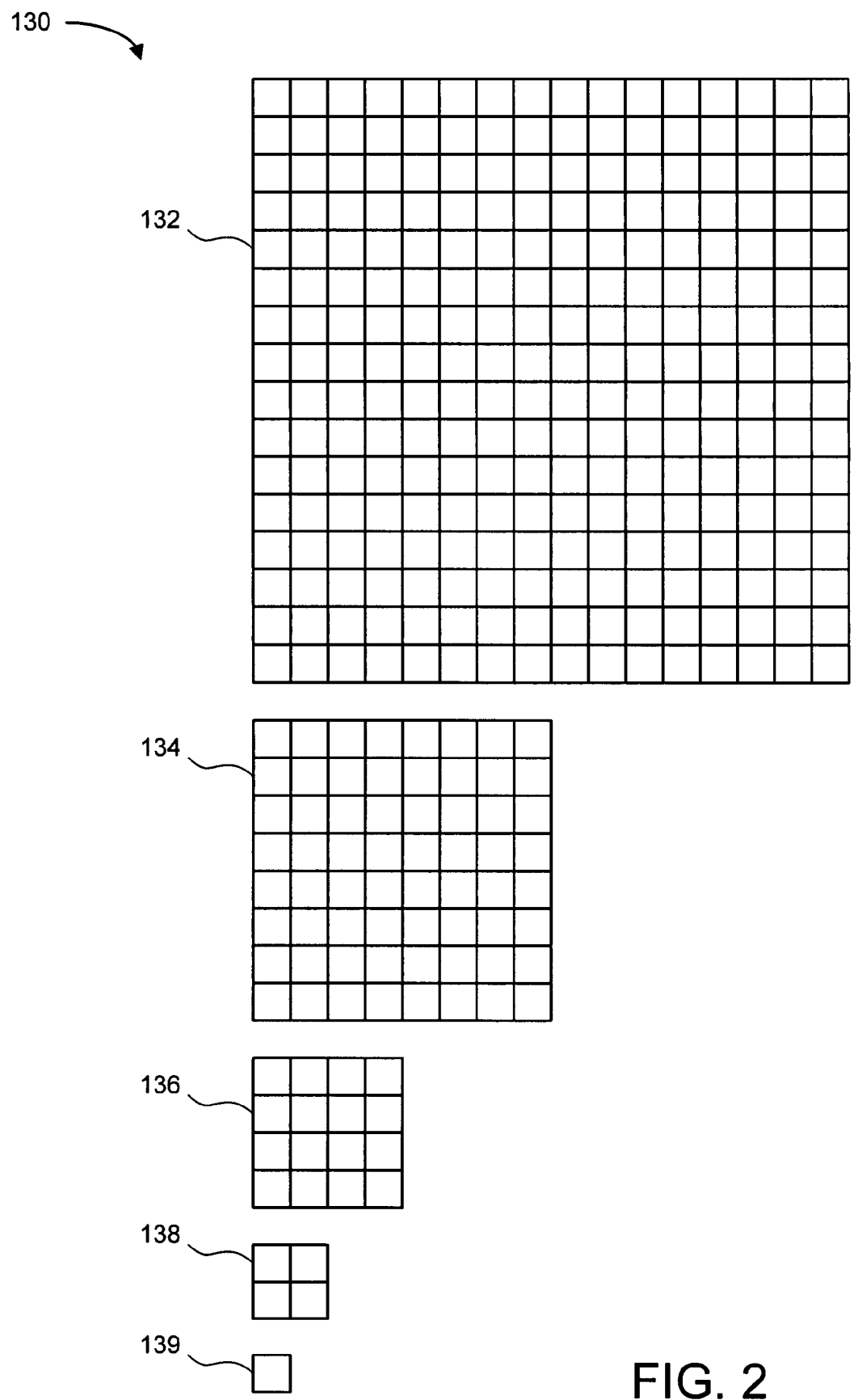
FIG. 2 depicts a schematic diagram of one embodiment of a plurality of texture maps corresponding to a plurality of levels of detail.

FIG. 2 depicts a schematic diagram of one embodiment of a plurality of texture maps 130 corresponding to a plurality of levels of detail. In particular, the plurality of texture maps 130 includes a high resolution texture map 132 including a 16×16 array of texels. The plurality of texture maps 130 also includes a low resolution texture map 139, which is a single texel. Between the high resolution texture map 132 and the low resolution texture map 139, there are several intermediate texture maps 134, 136, and 138 with varying resolutions. For example, the texture map 134 includes an 8×8 array of texels, the texture map 136 includes a 4×4 array of texels, and the texture map 138 includes a 2×2 array of texels.

Each of the plurality of texture maps 130 corresponds to a level of detail (LOD) because the detail of the texture representations vary among the plurality of texture maps 130. For example, the high resolution texture map 132 has more texture detail than the first intermediate texture map 134. Hence, the high resolution texture map 132 may be used to map very detailed textures to an object, or a part of an object, that is represented on the display device 106 as being close to the viewer. Similarly, the first intermediate texture map 134 has more texture detail than the second intermediate texture map 136, which has more texture detail than the third intermediate texture map 138, which has more texture detail than the low resolution texture map 139. Hence, the low resolution texture map 139 may be used to map low-detail textures to an object, or a part of an object, that is represented on the display device 106 as being far away from the viewer. Generating the plurality of texture maps 130 may be performed using various known texture map generation techniques, including compression, interpolation, filtering and so forth.

Since the high resolution texture map 132 represents the most detailed texture of the plurality of texture maps 130, the high resolution texture map 132 may be designated as "level 0." Similarly, the first intermediate texture map 134 may be designated as "level 1," the second intermediate texture map 136 may be designated as "level 2," the third intermediate texture map 138 may be designated as "level 3," and the low resolution texture map 139 may be designated as "level 4." Additionally, various values from the level of detail computation may correspond to each of the levels, or texture maps. In this way, the level of detail computation can be used to select one of the plurality of texture maps 130 to be used to texture an object, or a part of an object, represented on the display device 106.

Figure 3:
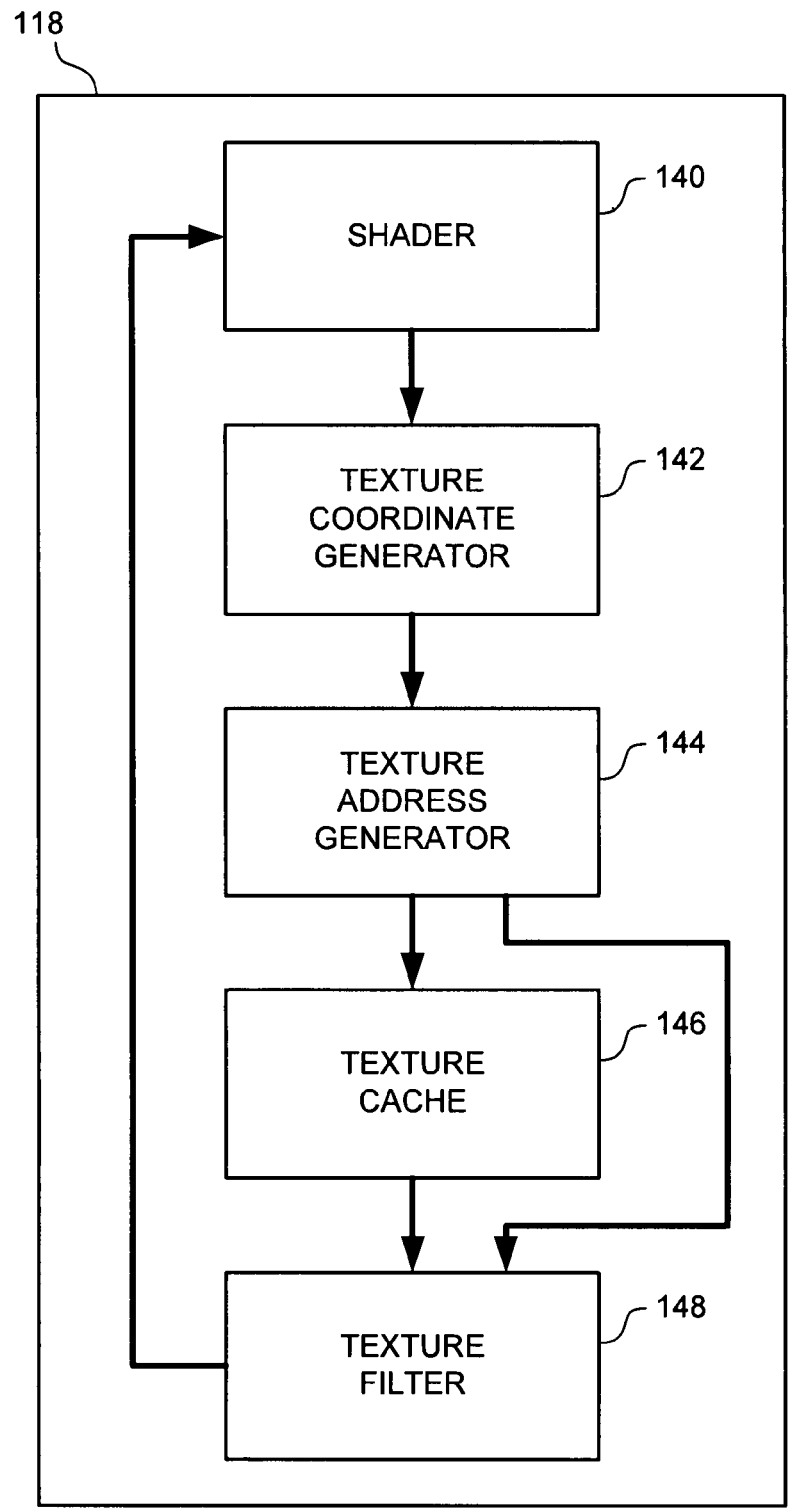
FIG. 3 depicts a schematic block diagram of one embodiment of a texture mapping pipeline for implementation in the texture engine.

FIG. 3 depicts a schematic block diagram of one embodiment of a texture mapping pipeline for implementation in the texture engine 118. The illustrated texture mapping pipeline includes a shader 140, a texture coordinate generator 142, a texture address generator 144, a texture cache 146, and a texture filter 148. However, other embodiments of the texture mapping pipeline may be implemented in other embodiments of the texture engine 118. Additionally, some of the stages described herein may be at least partially implemented by other components of the graphics processor 116.

In one embodiment, the shader 140 receives pixel coordinates corresponding to a triangle (or other drawing object) to be rendered on the display device 106. The texture coordinate generator 142 then generates texture coordinates corresponding to the pixel coordinates. In one embodiment, the texture coordinate generator 142 implements the level of detail computation, as described below. The texture address generator 144 then determines the memory address of the texture map corresponding to the level of detail computation. The texture address generator 144 sends the texture map address to the texture cache 146, which determines if the requested texture map is stored in the cache or in another memory device. If the texture map is stored in another memory device, then the texture cache 146 retrieves the requested data from the memory device and stores it in the texture cache 146. The texture cache 146 then provides a copy of the requested texture map to the texture filter 148.

The texture filter 148 correlates the texels of the texture map to each of the corresponding pixels of the display device 106. In some embodiments, there is a one-to-one correlation between the texels and the pixels with respect to size and location. Alternatively, there may be a one-to-one correlation between the texels and the pixels with respect to size, but the texture filter 148 nevertheless performs texture filtering because the locations of the texels do not align with the locations of the pixels. In other embodiments, the texel sizes are different from the pixel sizes, so the texture filter 148 implements magnification or minification to correlate the texels of the requested texture map to the pixels of the display device 106. Other embodiments of the texture filter 148 may implement other types of texture filtering.

Figure 4:
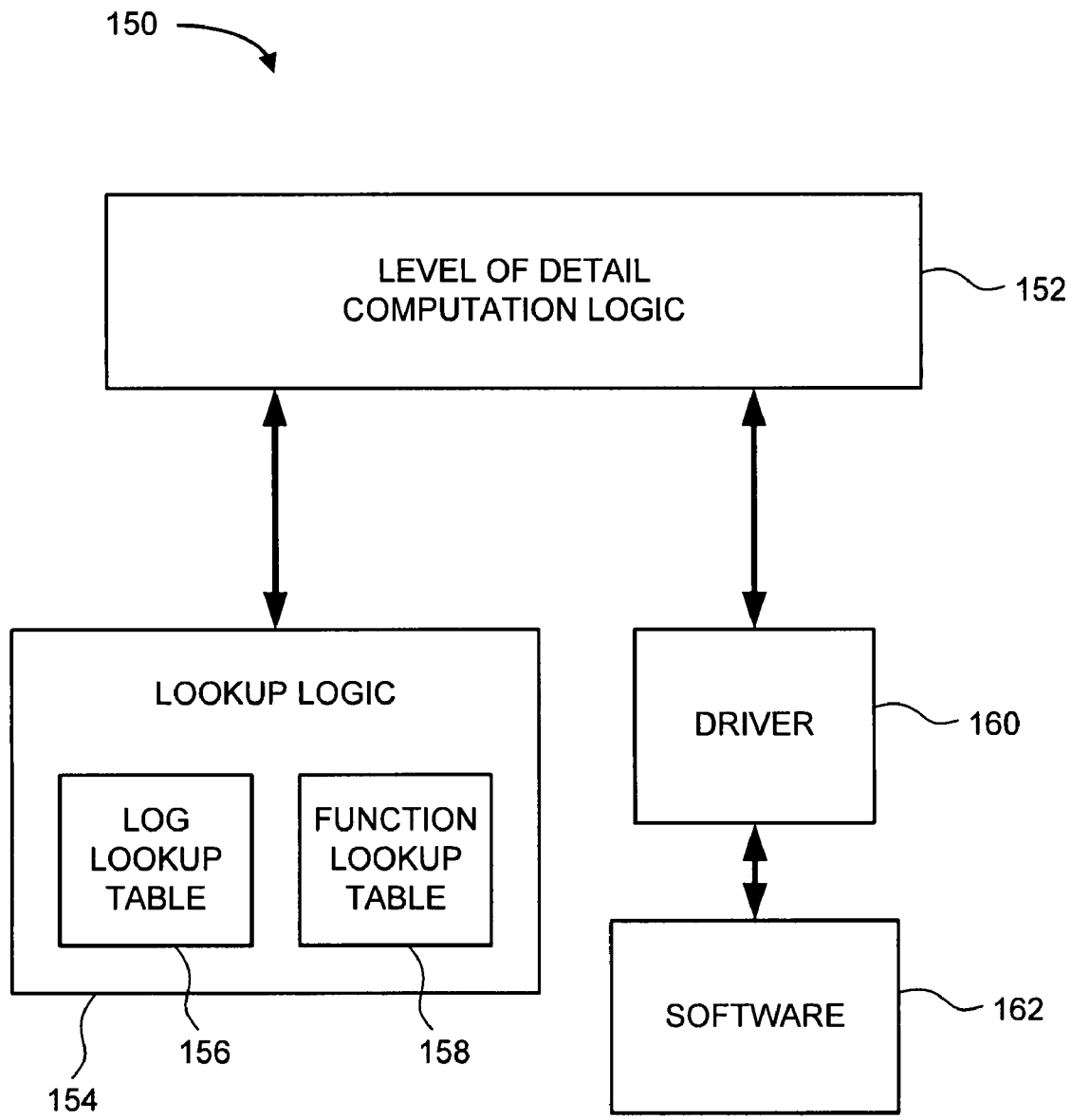
FIG. 4 depicts a schematic block diagram of one embodiment of a level of detail computation architecture.

FIG. 4 depicts a schematic block diagram of one embodiment of a level of detail computation architecture 150. The illustrated level of detail computation architecture 150 includes level of detail computation logic 152 and lookup logic 154. In one embodiment, the lookup logic 154 implements at least one log lookup table 156 and at least one function lookup table 158. These lookup tables 156 and 158 may be hardwired into the lookup logic 154. The level of detail computation architecture 150 also includes a driver 160 and software 162. In general, the level of detail computation architecture 150 is configured to perform a level of detail computation.

In one embodiment, the level of detail computation performed in conjunction with the level of detail computation architecture 150 is based on logarithmic mathematical equations derived from conventional level of detail computations. The use of these equations facilitates a less complicated hardware (or software) implementation of the conventional level of detail computation. In one embodiment, this improved level of detail computation is implemented using integer addition and lookup operations. Additionally, embodiments of this level of detail computation are implemented without using multiplication, square, or square root operations.

The following two-dimensional (2D) level of detail equation is a starting point to derive the level of detail computation implemented by the level of detail computation architecture 150 of FIG. 4.

$$LOD_{2D} = \log\sqrt{\begin{array}{l}\mathrm{Max}(((dsdx \times \mathrm{width})^2 + (dtdx \times \mathrm{height})^2), \\ ((dsdy \times \mathrm{width})^2 + (dtdy \times \mathrm{height})^2))\end{array}}$$

This equation can be written as follows:

$$LOD_{2D} = \mathrm{Max}\Big(\log\sqrt{((dsdx \times \mathrm{width})^2 + (dtdx \times \mathrm{height})^2)},\ \log\sqrt{((dsdy \times \mathrm{width})^2 + (dtdy \times \mathrm{height})^2)}\Big)$$

$$= \mathrm{Max}(L_1, L_2),$$

where $$L_1 = \log\sqrt{(dsdx \times \mathrm{width})^2 + (dtdx \times \mathrm{height})^2},$$

and $$L_2 = \log\sqrt{(dsdy \times \mathrm{width})^2 + (dtdy \times \mathrm{height})^2}$$

For each of the two log terms, $L_1$ and $L_2$, there are two multiplication operations, two square operations, one add operation, and one square root operation. These operations may be implemented in 32 bit floating point space. In order to remove the multiplication, square, and square root operations, the following notations are used:

$$A = dsdx \times \mathrm{width},\ \mathrm{and}$$

$$B = dtdx \times \mathrm{height}$$

Also, it is assumed that:

$$A \geq B,\ A \geq 0,\ \mathrm{and}\ B \geq 0$$

Therefore, it follows that:

$$(dsdx \times \mathrm{width})^2 \geq (dtdx \times \mathrm{height})^2$$

Using these notations and assumptions, the equation for the first log term, $L_1$, can be rewritten as follows:

$$\begin{aligned}L_1 &= \log\sqrt{A^2 + B^2} \\ &= \log\sqrt{A^2 \times \left(1 + \frac{B^2}{A^2}\right)} \\ &= \log\left(A\sqrt{\left(1 + \frac{B^2}{A^2}\right)}\right) \\ &= \log A + \log\sqrt{\left(1 + \frac{B^2}{A^2}\right)} \\ &= \log A + 0.5 \times \log\left(1 + \frac{B^2}{A^2}\right)\end{aligned}$$

Substituting back again for A and B results in:

$$\begin{aligned}L_1 &= \log(dsdx \times \mathrm{width}) + 0.5 \times \log\left(1 + \frac{(dtdx \times \mathrm{height})^2}{(dsdx \times \mathrm{width})^2}\right) \\ &= \log(dsdx) + \log(\mathrm{width}) + 0.5 \times \log\left(1 + \frac{(dtdx \times \mathrm{height})^2}{(dsdx \times \mathrm{width})^2}\right) \\ &= \log(dsdx) + \log(\mathrm{width}) + 0.5 \times \log\left(1 + \frac{(dtdx \times \mathrm{height})^2}{(dsdx \times \mathrm{width})^2}\right)\end{aligned}$$

A similar result can be obtained for the other log term, $L_2$, of the original equation:

$$\begin{aligned}L_2 &= \log\sqrt{(dsdy \times \mathrm{width})^2 + (dtdy \times \mathrm{height})^2} \\ &= \log(dsdy) + \log(\mathrm{width}) + 0.5 \times \log\left(1 + \frac{(dtdy \times \mathrm{height})^2}{(dsdy \times \mathrm{width})^2}\right)\end{aligned}$$

Thus, both of the log terms, $L_1$ and $L_2$, of the original equation can be rewritten into logarithmic equations with three components. The first component is the log(dsdx) or the log(dsdy) component. The second component is the log (width) component. And the third component is referred to as a function component. In one embodiment, the expected LOD is expressed in fixed point 7.5 format so that the integer portion is expressed using seven bits and the fractional portion is expressed using five bits. Other embodiments may use other numerical formats.

In one embodiment, the first component of each of the $L_1$ and $L_2$ equations may be derived from a lookup table (or separate lookup tables) such as the log lookup table 156. In one embodiment, the log lookup table 156 is a six bit table, although other embodiments may use other types of tables.

The second component of each of the $L_1$ and $L_2$ equations may be provided, in part, by the software 162. In one embodiment, the second component is a per texture attribute, so the log(width) component may be in fixed point 7.5 format by the driver 160. Other embodiments may generate the second component in another manner.

The third component of each of the $L_1$ and $L_2$ equations is the function component. In order to obtain the function component for the $L_1$ equation, it may be written as follows:

$$f(x) = 0.5 \times \log\left(1 + \frac{(dtdx \times \text{height})^2}{(dsdx \times \text{width})^2}\right)$$

$$= 0.5 \times \log\left(1 + \frac{B^2}{A^2}\right)$$

$$= 0.5 \times \log\left(1 + \left(\frac{B}{A}\right)^2\right)$$

$$= 0.5 \times \log(1 + (2^{(\log(B)-\log(A))})^2)$$

$$= 0.5 \times \log(1 + 2^{2\times(\log(B)-\log(A))})$$

$$= 0.5 \times \log(1 + 2^{2\times(\log(dtdx \times \text{height})-\log(dsdx \times \text{width}))})$$

$$= 0.5 \times \log(1 + 2^{2\times(\log(dtdx)+\log(\text{height})-(\log(dsdx)+\log(\text{width})))})$$

$$= 0.5 \times \log(1 + 2^{2\times(\log(dtdx)-\log(dsdx)+\log(\text{height})-\log(\text{width}))})$$

Therefore, the equation for the function component of the $L_1$ equation may be rewritten as follows:

$f(x)=0.5\times\log(1+2^{2x})$, where $x=\log(dtdx)-\log(dsdx)+\log(\text{height})-\log(\text{width})$ Using this notation, the $L_1$ equation can be rewritten as follows:

$L_1=\log(dsdx)+\log(\text{width})+f(x)$

Using similar mathematics and notations, the $L_2$ equation can be rewritten as follows:

$L_2=\log(dsdy)+\log(\text{width})+f(y)$, where $f(y)=0.5\times\log(1+2^{2y})$ and $y=\log(dtdy)-\log(dsdy)+\log(\text{height})-\log(\text{width})$ In one embodiment, the third component—the function component—of the $L_1$ and $L_2$ equations may be derived from a lookup table (or separate tables) such as the function lookup table 158. One example of the function table 158 is provided below, although other embodiments may use other lookup tables.

```
S12 log_adj_table[64] = {
0x10, 0x0f, 0x0f, 0x0e, 0x0e, 0x0d, 0x0d, 0x0c,
0x0c, 0x0b, 0x0b, 0x0b, 0x0a, 0x0a, 0x0a, 0x09,
0x09, 0x09, 0x08, 0x08, 0x08, 0x07, 0x07, 0x07,
0x06, 0x06, 0x06, 0x06, 0x06, 0x05, 0x05, 0x05,
0x05, 0x04, 0x04, 0x04, 0x04, 0x04, 0x04, 0x03,
0x03, 0x03, 0x03, 0x03, 0x03, 0x03, 0x02, 0x02,
0x02, 0x02, 0x02, 0x02, 0x02, 0x02, 0x02, 0x02,
0x01, 0x01, 0x01, 0x01, 0x01, 0x01, 0x01, 0x01
};
```

Since $A \geq B$, $A \geq 0$, and $B \geq 0$, it follows that:

$$1 \geq \frac{B}{A} \geq 0$$

$$\Rightarrow 1 \geq \frac{B}{A} \geq 0$$

$$\Rightarrow 1 \geq \left(\frac{B}{A}\right)^2 \geq 0$$

$$\Rightarrow 2 \geq 1 + \left(\frac{B}{A}\right)^2 \geq 1$$

$$\Rightarrow \log 2 \geq \log\left(1 + \left(\frac{B}{A}\right)^2\right) \geq \log 1$$

$$\Rightarrow 1 \geq \log\left(1 + \left(\frac{B}{A}\right)^2\right) \geq 0$$

$$\Rightarrow 0.5 \geq 0.5 \times \log\left(1 + \left(\frac{B}{A}\right)^2\right) \geq 0$$

Therefore, the function component of each of the $L_1$ and $L_2$ equations is within the range of [0.0, 0.5]. In one embodiment, the input is in 7.5 fixed point format, and the function lookup table 158 is a six bit table. However, other embodiments may use other formats.

In one embodiment, using the above components for each of the $L_1$ and $L_2$ equations facilitates performing the level of detail computation with only lookup tables and integer math. Therefore, the hardware does not necessarily need to be implemented to perform multiplication, square, and square root operations.

In another embodiment, logarithmic math also may be used to derive similar equations for a three-dimensional (3D) level of detail computation. A 3D level of detail computation also may be referred to as a volume texture level of detail computation. The following 3D level of detail equation is a starting point to derive the level of detail computation implemented by the level of detail computation architecture 150 of FIG. 4.

$$LOD_{3D} = \log\sqrt{\begin{array}{c}\text{Max}(((dsdx \times \text{width})^2 + (dtdx \times \text{height})^2 + (drdx \times \text{depth})^2), \\ ((dsdy \times \text{width})^2 + (dtdy \times \text{height})^2 + (dtdy \times \text{depth})^2))\end{array}}$$

$$= \text{Max}\left(\log\sqrt{(dsdx \times \text{width})^2 + (dtdx \times \text{height})^2 + (drdx \times \text{depth})^2},\right.$$
$$\left.\log\sqrt{(dsdy \times \text{width})^2 + (dtdy \times \text{height})^2 + (drdy \times \text{depth})^2}\right)$$

$$= \text{Max}(V_1, V_2),$$

where $$V_1 = \log\sqrt{(dsdx \times \text{width})^2 + (dtdx \times \text{height})^2 + (drdx \times \text{depth})^2},$$

and $$V_2 = \log\sqrt{(dsdy \times \text{width})^2 + (dtdy \times \text{height})^2 + (drdy \times \text{depth})^2}$$

Each component of the 3D level of detail computation may be simplified using mathematical operations similar to those described above for the 2D level of detail computation. For example, the $V_1$ equation can be rewritten as follows:

$$V_1 = \log\sqrt{A^2+B^2+C^2}, \text{ where}$$

$$A = dsdx \times \text{width}$$

$$B = dtdx \times \text{height, and}$$

$$C = drdx \times \text{depth}$$

Using an additional substitution, the $V_1$ equation can be rewritten as follows:

$$V_1 = \log\sqrt{D^2+C^2}, \text{ where}$$

$$D = \sqrt{A^2+B^2}$$

Therefore, it follows that:

$$V_1 = \log D + 0.5 \times \log\left(1 + \frac{C^2}{D^2}\right)$$

Substituting back for D in the first term provides:

$$V_1 = \log\sqrt{A^2+B^2} + f(x'), \text{ where}$$

$$f(x') = 0.5 \times \log(1+2^{2x'}) \text{ and}$$

$$x' = \log(drdx) - \log(\text{depth}) - L_1$$

Since the terms $\log\sqrt{A^2+B^2}$ and $L_1$ are defined above for the 2D level of detail computation, the $V_1$ equation can be rewritten as follows:

$$V_1 = L_1 + f(x')$$

Therefore, the 3D level of detail computation may be performed using similar operation as the 2D level of detail computation. Furthermore, some embodiments compute $L_1$ using the 2D process described above, then compute $f(x')$ using the same lookup logic and computation method as for $f(x)$. In one embodiment, the 3D level of detail computation is performed using only lookup tables and integer math.

Figure 5:
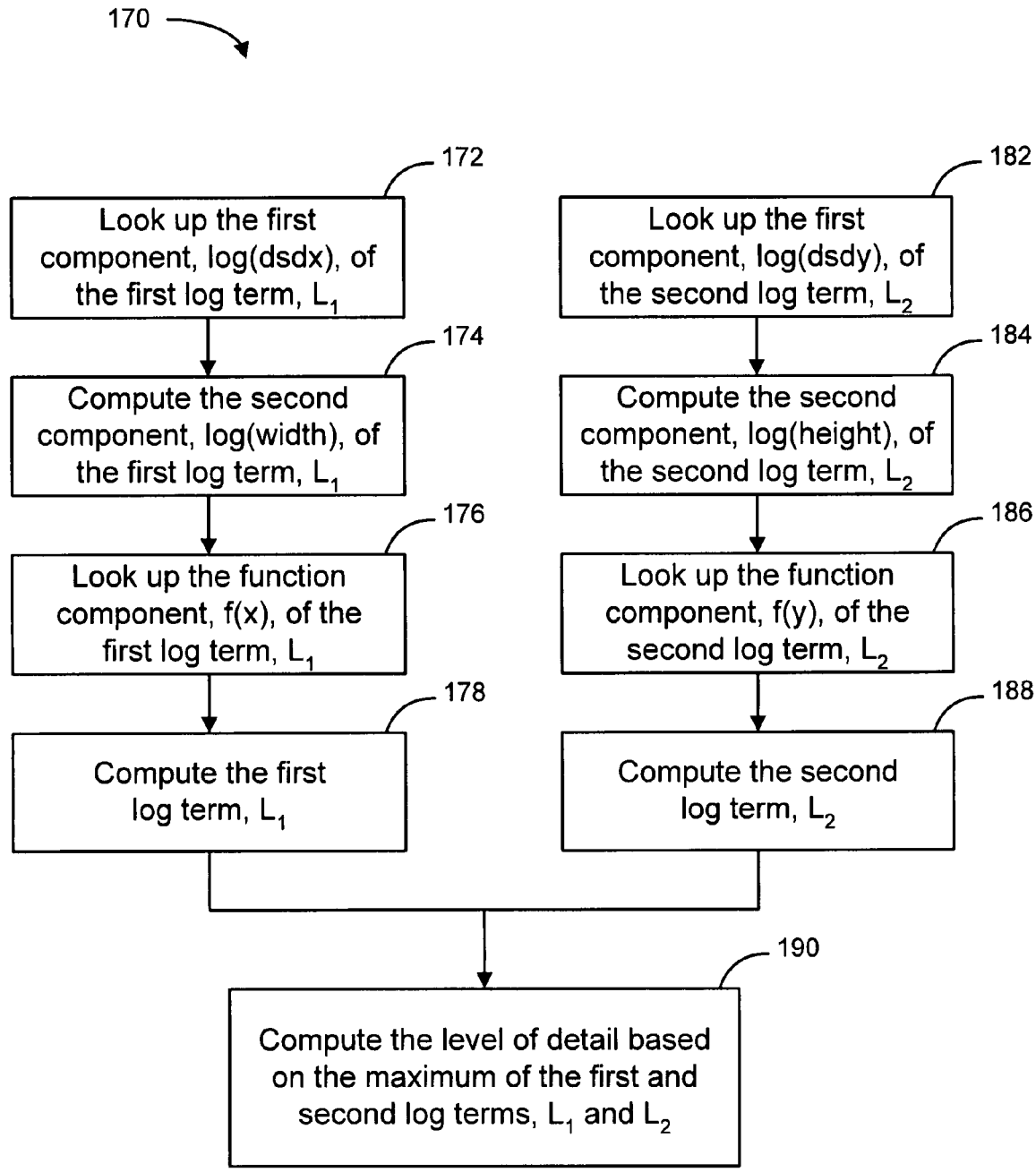
FIG. 5 depicts a schematic flow chart diagram of one embodiment of a level of detail computation method.

FIG. 5 depicts a schematic flow chart diagram of one embodiment of a level of detail computation method 170. Although some embodiments of the level of detail computation method 170 may be implemented in conjunction with the level of detail computation architecture 150 of FIG. 4, other embodiments may be implemented in conjunction with other level of detail computation architectures. Also, the depicted implementation of the level of detail computation method 170 corresponds to a 2D level of detail computation, but other embodiments may be implemented for 3D level of detail computations.

In the depicted level of detail computation method 170, the lookup logic 154 references the log lookup table 156 to look up 172 the first component, log(dsdx), of the first log term, $L_1$. Then, the driver 160 provides 174 the second component, log(width), of the first log term, $L_1$. Then, the lookup logic 154 references the function lookup table 158 to look up 176 the function component, $f(x)$, of the first log term, $L_1$. Using these three components, the level of detail computation logic 152 computes 178 the first log term, $L_1$.

The level of detail computation logic 152 uses similar operations for the second log term, $L_2$. The lookup logic 154 references the log lookup table 156 to look up 182 the first component, log(dsdy), of the second log term, $L_2$. Then, the driver 160 provides 184 the second component, log(width), of the second log term, $L_2$. Then, the lookup logic 154 references the function lookup table 158 to look up 186 the function component, $f(y)$, of the second log term, $L_2$. Using these three components, the level of detail computation logic 152 computes 188 the second log term, $L_2$.

The level of detail computation logic 152 then computes 190 the level of detail based on the maximum of the first and second log terms, $L_1$ and $L_2$. The depicted level of detail computation method 170 then ends.

It should be noted that embodiments of the level of detail computation method 170 may be implemented in software, firmware, hardware, or some combination thereof. Additionally, some embodiments of the level of detail computation method 170 may be implemented using a hardware or software representation of one or more algorithms related to the operations described above. For example, software, hardware, or a combination of software and hardware may be implemented to compute one or more of the various terms or components described above.

Embodiments of the invention also may involve a number of functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A graphic processing system to compute a texture level of detail, the graphic processing system comprising:
    a memory device to implement a first lookup table, the first lookup table to provide a first level of detail component;
    a driver to calculate a log value of a second level of detail component; and
    level of detail computation logic coupled to the memory device and the driver, the level of detail computation logic to compute a level of detail for a texture mapping operation based on the first level of detail component and the second level of detail component;
    the memory device further configured to implement a second lookup table, the first lookup table comprising a log lookup table to provide log values of the first level of detail component, and the second lookup table comprising a function lookup table to provide values of a function component of the level of detail computation.

2. The graphic processing system of claim 1, the level of detail computation comprising a two-dimensional level of detail computation.

3. The graphic processing system of claim 1, the level of detail computation comprising a three-dimensional level of detail computation.

4. The graphic processing system of claim 1, further comprising a software module coupled to the driver, the software module to provide a dimension value to the driver, the second level of detail component comprising a log value of the dimension value.

5. The graphic processing system of claim 4, the dimension value corresponding to a width, a height, or a depth.

6. A processor-implemented method for computing a texture level of detail, the method comprising:
    computing a first log term based on a first plurality of level of detail components, the first log term corresponding to a first dimension of a texture map, the first plurality of level of detail components generated with lookup and arithmetic operations other than multiplication;
    computing a second log term based on a second plurality of level of detail components, the second log term corresponding to a second dimension of a texture map, the second plurality of level of detail components generated with lookup and arithmetic operations other than multiplication; and
    computing the level of detail according to a maximum of the first and second log terms.

7. The processor-implemented method of claim 6, further comprising looking up a first level of detail component of the first log term from a log lookup table.

8. The processor-implemented method of claim 7, further comprising obtaining a second level of detail component of the first log term from a driver, the driver receiving a dimension value from software.

9. The processor-implemented method of claim 8, further comprising looking up a third level of detail component of the first log term from a function lookup table, the third level of detail component comprising a function component.

10. The processor-implemented method of claim 9, further comprising generating a sum of the first, second, and third level of detail components to compute the first log term.

11. The processor-implemented method of claim 6, the arithmetic operations comprising operations other than square and square root operations.

12. The processor-implemented method of claim 11, wherein the first dimension of the texture map is a texture map width and the second dimension of the texture map is a texture map height.

13. An apparatus for computing a texture level of detail, the apparatus comprising:
    means for computing first and second log terms using operations other than multiplication, square, and square root operations, wherein the first and second log terms are associated with first and second dimensions of a texture map, respectively; and
    means for computing the texture level of detail based on the first and second log terms.

14. The apparatus of claim 13, the means for computing the first and second log terms further configured for computing the first and second log terms using only lookup operations and integer math operations.

15. The apparatus of claim 13, further comprising:
    means for implementing a first plurality of log lookup values for the first log term;
    means for implementing a first plurality of function lookup values for the first log term;
    means for implementing a second plurality of log lookup values for the second log term; and
    means for implementing a second plurality of function lookup values for the second log term.

* * * * *